No. 827,400. PATENTED JULY 31, 1906.
S. L. SHEUERMAN & J. F. HAND.
M. N. BAKER, ADMINISTRATOR OF J. F. HAND, DEC'D.
APPARATUS FOR PURIFYING AND SOFTENING WATER.
APPLICATION FILED MAY 20, 1905.
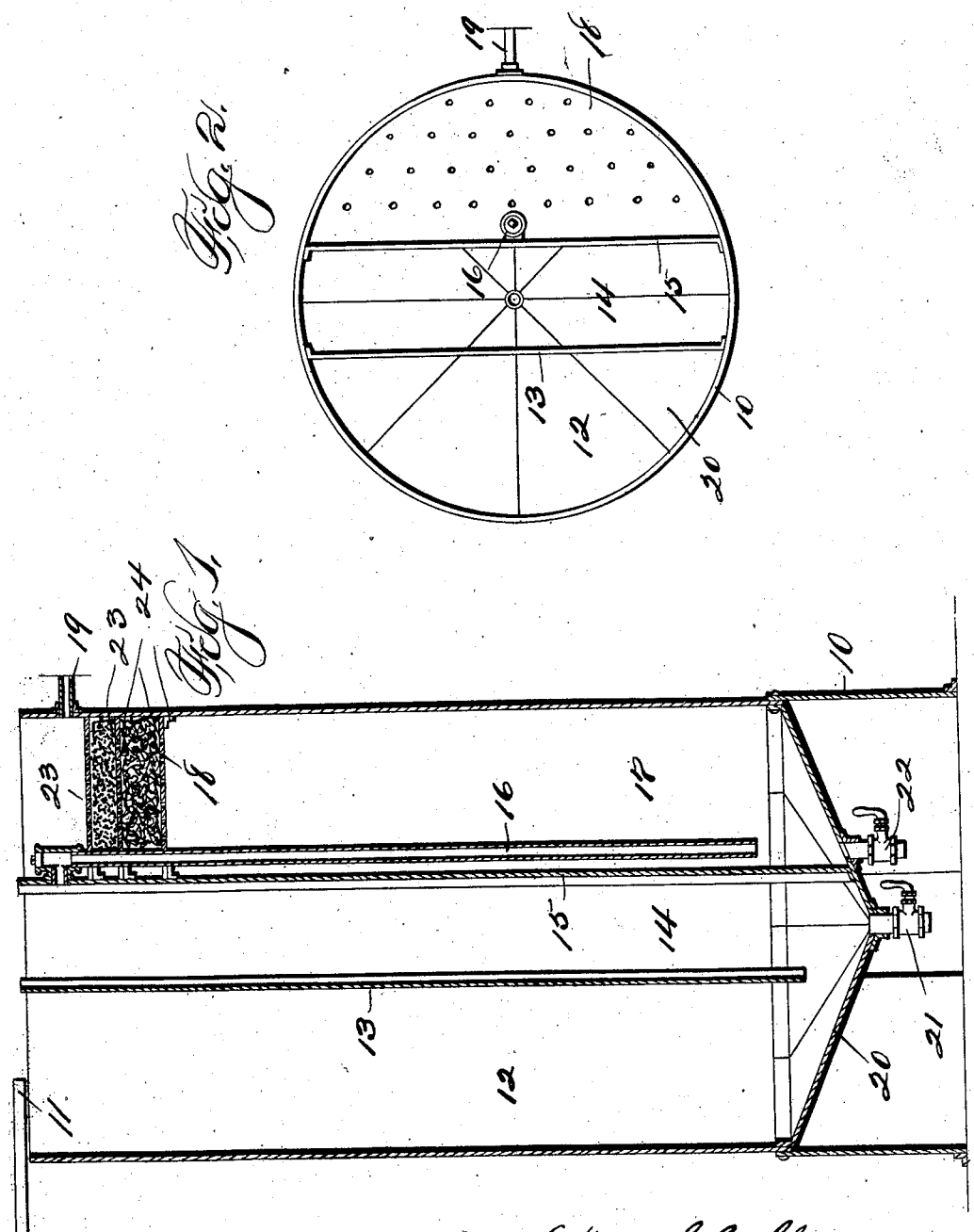

UNITED STATES PATENT OFFICE.

SOLOMON L. SHEUERMAN AND JUAN F. HAND, OF DES MOINES, IOWA;
M. N. BAKER ADMINISTRATOR OF SAID JUAN F. HAND, DECEASED.

APPARATUS FOR PURIFYING AND SOFTENING WATER.

No. 827,400. Specification of Letters Patent. Patented July 31, 1906.

Application filed May 20, 1905. Serial No. 261,411.

*To all whom it may concern:*

Be it known that we, SOLOMON L. SHEUERMAN and JUAN F. HAND, citizens of the United States, residing at Des Moines, in the county of Polk, State of Iowa, have invented new and useful Improvements in Apparatus for Purifying and Softening Water, of which the following is a specification.

This invention relates to an improved apparatus for purifying and softening water, and has for its object to produce an efficient apparatus of this class which will operate for a considerable time without being clogged, the arrangement of a filter in such manner that it may be readily and thoroughly cleansed without incurring an unnecessary waste of water, the arrangement of sediment-chambers and partitions separating the chambers, and valves for emptying the sediment-chambers.

As regards the chemical process, as also the choice of reagents for the preparation of the water and the arrangement of the vessels containing the reagents, the same are already known and depend in part upon the character of the water and partly upon local causes, and this invention does not relate to same, but solely to the construction of the apparatus.

The chief feature of our invention consists in obtaining an apparatus of any desired form which is provided, by means of partitions, with several chambers, so that the onward movement is thereby retarded and the deposit of sediment is secured.

In the drawings, Figures 1 and 2 show a tank or receptacle (designated by the numeral 10) into which leads an inlet-pipe 11, leading from a source of water-supply, the water being impregnated with a reagent before discharging into the tank 11. From the inlet-pipe 11 the fluids, water, and reagent pass into the chamber 12, formed by the partition 13, in which chamber 12 the reaction and purification begins. The fluid passes through underneath partition 13 into the chamber 14, the partition 15 of which directs it in an upward direction to flow through the pipe 16, leading from the top of the chamber 14 to a point near the bottom of the chamber 17, where it is again directed upwardly and through a filter 18 to a pipe 19, whence it is led off. In the chambers 12 and 14 because of the movement of the water in vertical directions the heavier chemical combinations are precipitated and deposit on the upper face of the bottom 20. The bottom 20, as shown, is inverted frustal-shaped; but in our experiments we have found a concaved bottom to operate in substantially the same manner. Hence we do not desire to be understood as limiting ourselves to the construction of the bottom, as shown. A faucet 21 at the lower part of the chambers 12 and 14 allows of the withdrawal of the sediments. The pipe 16 terminates some distance above the bottom 20 within the chamber 17, which causes the liquid resting beneath it to remain free from agitation, and thus secure the deposit in the chamber 17, which may be withdrawn through the faucet 22. The water passes up through the chamber 17 and through the filter 18, thus completing the reaction, and the purified water passes into the pipe 19.

The filter 18 comprises perforated plates 23, which rest on supports 24, fixed to the wall of the tank 10 and to the partition 15. The plates form compartments, the lower one of which is filled with excelsior, paper-pulp, wood fiber, or the like and the upper compartment filled with charcoal, coke, or the like.

It will be obvious that when it is desired to cleanse or flush the upper face of the bottom 20 it is only necessary to open the faucets 21 and 22, the movement of the water being sufficient to remove the sediment. It will be obvious, further, that when it is desired to cleanse the filter it is necessary only to withdraw enough water from the chamber 17 to expose the filter, which may then be lifted out and cleansed.

Having thus described our invention, what we claim as new therein, and desire to secure by Letters Patent of the United States therefor, is—

An apparatus for purifying and softening water embodying a cylindrical tank having a concaved bottom, a pair of partitions in said tank arranged parallel to one another and in spaced relation, one of said partitions extending from the top of the tank to a point adjacent the bottom thereof, the other partition extending from the tank-top to the tank-bottom, a filter embodying a plurality of spaced plates supported from said second partition and the adjacent wall of the tank, a pipe extending through said plates and having its upper end projecting through said second partition at a point below the top thereof, and having its lower end terminating adjacent the tank-bottom.

SOLOMON L. SHEUERMAN.
JUAN F. HAND.

Witnesses:
R. G. ORWIG,
J. E. BOWERS.